Jan. 4, 1938.   E. N. ANKETELL   2,104,476
CAMERA MODEL
Filed Dec. 11, 1936
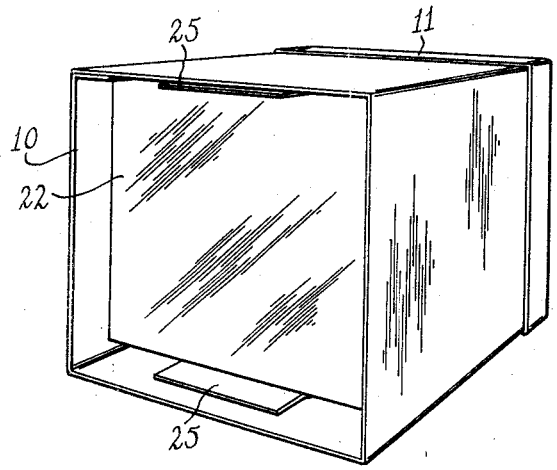
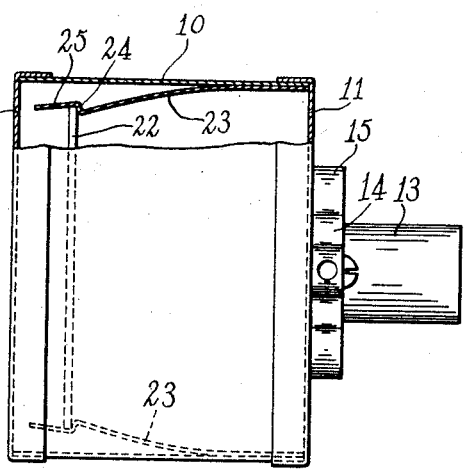
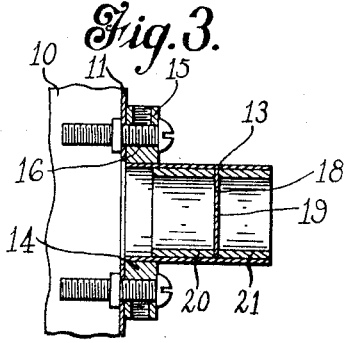
Inventor
Edward N. Anketell
By Rockwell Barcholow
Attorneys Patented Jan. 4, 1938

2,104,476

UNITED STATES PATENT OFFICE 2,104,476

CAMERA MODEL

Edward N. Anketell, New Haven, Conn., assignor to The A. C. Gilbert Company, New Haven, Conn., a corporation of Maryland Application December 11, 1936, Serial No. 115,376

6 Claims. (Cl. 35—49)

This invention relates to a camera model, and more particularly to a device sometimes known as a pin-hole camera, which is not designed for taking pictures but used to throw an image upon a plate or screen to be observed by the operator.

The device illustrated in the application has particular reference to a camera model which may be constructed by means of parts furnished with an optical set from which many other devices may be made, and is a device from which a child may derive considerable pleasure, not only by constructing the device himself and thereby learning some of the principles of optics, but by viewing through the device the image of various objects thrown upon the plate.

The invention has particular reference to the means for holding the screen or plate in place, and it has for its object the provision of a simple and effective holding means which will satisfactorily hold a plate of glass or similar transparent substance, and at the same time will permit the glass to be readily removed so that the parts of the device may be used for the construction of other optical instruments.

To these and other ends the invention consists in the novel features and combinations of parts to be hereinafter described and claimed.

In the accompanying drawing:

Fig. 1 is a perspective view of a camera model embodying my invention;

Fig. 2 is a side elevational view of the same, certain of the parts being shown in section; and Fig. 3 is a sectional view of the barrel of the camera.

To illustrate a preferred embodiment of my invention, I have shown a camera model comprising a box or housing 10 having front and rear flanged end portions 11 and 12, one or both of which may be removable and supported upon the body portion 10 by friction. In any case, the rear end portion or cover 12 will be removable to permit insertion and removal of the plate, as will be hereinafter described.

To the front end portion of the box is secured the lens barrel 13. The rear end portion of this barrel is frictionally embraced by a coupling member 14 having flanges 15 provided with openings 16 through which bolts or screws may be passed to secure it in place.

Within this barrel is a diaphragm 18 having at the center thereof a pin-hole opening 19. This diaphragm is held in place by spacing sleeves or tubes 20 and 21, which frictionally engage the inner surface of the barrel 11. The position of the diaphragm may be changed by adjustment of the spacers 20 and 21, or by the use of spacers of various lengths.

Within the camera box means are provided for removably supporting the plate 22 upon which the image is received, which preferably will be a plate of ground glass. As a convenient means for this purpose, I have secured to the upper and lower sides of the box relatively wide flat spring members 23. These spring members are secured at one end to the box, and the other end is left free so that the free ends may be spread apart to receive the plate. These members, as shown in Fig. 1, are relatively wide so as to hold the plate in a true horizontal position, and their free ends project inwardly from the top and bottom of the box.

Adjacent their free ends these spring members or fingers are bent outwardly at 24 to provide a rearwardly facing shoulder, and are then continued rearwardly beyond this shoulder, as shown at 25. The free ends 25 may be turned inwardly to a slight extent to provide a gripping action upon the plate adjacent the shoulder 24, so that there will be no tendency of this plate to be urged in a rearward direction.

It will be obvious that, when it is desired to insert the plate 22 in place, the free ends 25 of the spring members may be separated or moved outwardly toward the top and bottom of the box and the plate inserted therein until it abuts the shoulders 24. Upon release of the springs the latter will be urged inwardly and will releasably grip the plate and hold it securely but removably in place. It will, of course, be obvious that the displacement of the springs to admit the plate may be done by simply pressing the edge of the plate against one of the spring ends, which will displace it to a sufficient extent to permit the insertion of the plate. The plate may also be very readily removed when desired by merely raising the free end of one of the springs.

While I have shown and described a preferred embodiment of my invention, it will be understood that it is not to be limited to all of the details shown, but is capable of modification and variation within the spirit of the invention and within the scope of the appended claims.

What I claim is:

1. A camera model comprising a housing equipped with light projecting means and resilient members within the housing for engaging a plate at opposite edges and holding it removably in facing relation to the projecting means.

2. A camera model having a housing and plate-holding spring fingers mounted on opposite walls in approximately parallel relation to each other.

3. A camera model having fingers fixed at one end and provided with resilient plate-engaging free ends between which a plate is removably gripped.

4. A camera model comprising a housing, projecting means carried by a wall of the housing, and plate-holding means secured within the housing for holding a plate in facing relation to said projecting means, said plate-holding means comprising springs secured at one end to the housing, the other end of each spring being left free, and said spring having an outwardly displaced portion adjacent its free end to provide a gripping means for the plate edge and a shoulder against which the face of the plate abuts.

5. A camera model comprising a housing, projecting means carried by a wall of the housing, and plate-holding means secured within the housing for holding a plate in facing relation to said projecting means, said plate-holding means comprising a pair of springs, one secured to each of two opposite walls of the housing, each of said springs being secured to the housing at one end thereof, and having an outwardly displaced portion adjacent its free end providing a rearwardly facing shoulder, the free ends of said springs rearwardly of said shoulders being adapted to grip the plate when inserted therebetween with the plate resting against said shoulders.

6. A camera model comprising a housing, projecting means carried by a wall of the housing means, and plate-holding means secured within the housing for holding a plate in facing relation to said projecting means, said plate-holding means comprising a pair of springs, one secured to each of two opposite walls of the housing, each of said springs being secured to the housing at one end thereof, and having an outwardly displaced portion adjacent its free end providing a rearwardly facing shoulder, the free ends of said springs rearwardly of said shoulders being adapted to grip the plate when inserted therebetween with the plate resting against said shoulders, and said springs being relatively wide to grip said plate over a substantial area.

EDWARD N. ANKETELL.